Nov. 5, 1957 D. L. CURTIS 2,812,451

COMPLEMENTARY SIGNAL GENERATING NETWORKS

Filed Sept. 5, 1952 2 Sheets-Sheet 1

INVENTOR.
DANIEL L. CURTIS,
BY
Seymour M. Rosenberg
ATTORNEY.

INVENTOR.
DANIEL L. CURTIS,
BY
Seymour M. Rosenberg
ATTORNEY.

United States Patent Office 2,812,451

Patented Nov. 5, 1957

2,812,451

COMPLEMENTARY SIGNAL GENERATING NETWORKS

Daniel L. Curtis, Venice, Calif., assignor, by mesne assignments, to Hughes Aircraft Company, a corporation of Delaware Application September 5, 1952, Serial No. 308,045

12 Claims. (Cl. 307—88.5)

This invention relates to complementary signal generating networks and more particularly to complementary signal generating networks which are responsive to the voltage level of an applied control signal for producing two complementary electrical output signals.

In numerous electronic systems, and particularly in the electronic digital computer art, it is often desirable to generate two complementary electrical signals corresponding to the relatively high and low voltage levels, respectively, of a variable voltage electrical intelligence signal in order to selectively actuate other electrical circuits under the control of the voltage level of the intelligence signal. In other words, if the voltage level of the intelligence signal is relatively high, an electrical output signal will be presented at a first output terminal, whereas if the voltage level of the intelligence signal is relatively low, an electrical output signal will be presented at a second output terminal.

More specifically, in the electronic digital computer art, the variable voltage electrical intelligence signal represents binary coded intelligence information, the two voltage levels of the intelligence signal corresponding to the binary values zero and one, respectively. In order to utilize the single two-level intelligence signal to selectively actuate associated electronic circuits in accordance with the binary value which is represented by the instantaneous voltage level of the intelligence signal, it is customary to generate two complementary electrical pulse trains or output signals corresponding to the two voltage levels of the intelligence signal, respectively. Thus, when the intelligence signal is at one voltage level, a train of electrical pulses is produced at the first output terminal, whereas a train of electrical pulses is produced at the second output terminal when the intelligence signal is at its other voltage level.

In the prior art, the variable voltage intelligence signal most commonly is derived from a voltage state gating matrix and represents a function of a plurality of binary variables. In order to convert the intelligence signal to a pair of complementary electrical pulse signals, the intelligence signal is applied to a conventional logical "and" gate to produce one of the complementary pulse signals, and is applied to the input end of an inverter circuit, the output end of which is applied to another conventional logical "and" gate to produce the other complementary pulse signal.

One of the principal disadvantages of this prior art circuit is that the input end of the inverter circuit, and more particularly the input capacitance, unduly loads the voltage state gating matrix and, therefore, results in relatively large power requirements in the voltage state gating matrix. Another marked disadvantage of this prior art circuit is that the inverter has inherent gain which results in amplification of any noise present in the applied intelligence signal. Since the output signal from the inverter is usually clamped, the signal to noise ratio of the output signal is relatively poor and often results in actuation of the associated "and" gate due to noise fluctuations in the output signal. In addition, this prior art circuit requires at least one vacuum tube and associated electrical components.

Another technique which has been utilized in the prior art is the rather obvious expedient of employing a second voltage state gating matrix for producing a second variable voltage electrical output signal which is the complement of the first variable voltage output signal. The two complementary variable voltage output signals are then employed for controlling two respectively associated "and" gates to produce the desired complementary electrical pulse output signals.

In practice, this prior art technique is often utilized advantageously where the electrical structure of each of the voltage state gating matrices is relatively simple, since it eliminates the excessive power requirements and noise distortion inherent in the other prior art circuit set forth above. However, when the electrical structure of the voltage state gating matrix is relatively complex, which is most often the case, the construction of a second voltage state gating matrix for producing a complementary variable voltage electrical signal is prohibitively expensive.

The present invention, on the other hand, provides complementary signal generating networks or "logical" networks which obviate the above and other disadvantages of both prior art circuits while retaining the advantages of each. According to the basic feature of this invention, the complementary signal generating networks or "logical" networks are operable under the control of two predetermined voltage levels of an applied variable voltage electrical signal for selectively passing an applied electrical pulse signal to produce two corresponding complementary electrical pulse output signals.

More particularly, the complementary signal generating networks of this invention comprise two electronic gating circuits, each of which includes a unidirectional current device which is responsive to a different voltage level of the applied variable voltage electrical signal for selectively passing an applied electrical pulse signal to produce two complementary electrical pulse output signals at two associated output terminals, respectively.

According to one embodiment of this invention, the complementary signal generating network is responsive to a first predetermined voltage level of an applied variable voltage signal for selectively passing an applied negative electrical pulse signal to produce a first electrical pulse output signal at a first output terminal, and is responsive to a second predetermined voltage level of the applied variable voltage signal for selectively passing the applied pulse signal to produce a second electrical pulse output signal at a second output terminal. The output terminals are connected to the anodes of two respectively associated unidirectional current devices or diodes, each of which is selectively actuated or front biased by a different predetermined voltage level of the control signal for presenting the applied negative pulse signal at its associated output terminal. Since the variable voltage control signal may have a relatively high or a relatively low voltage level at any instant, only one of these diodes may be front biased at any one instant. Accordingly, the applied pulse signal is presented at only that output terminal associated with a front-biased diode, and is inhibited from appearing at the other output terminal because as its associated diode is back-biased.

According to another embodiment of this invention, the complementary signal generating network is responsive to the voltage level of an applied variable voltage control signal for selectively passing an applied positive electrical pulse signal. The most significant structural difference between this embodiment and the embodiment set forth above is that the polarity of each of the unidirectional current devices, or diodes, is reversed. The basic principle of operation, however, is the same.

It is, therefore, an object of this invention to provide a complementary signal generating network which is relatively inexpensive and which has negligible time delay.

An additional object of this invention is to provide a complementary signal generating network for producing two complementary electrical output signals corresponding to two predetermined voltage levels, respectively, of a variable voltage control signal.

Another object of this invention is to provide a complementary signal generating network for producing two complementary electrical output signals corresponding to the voltage levels, respectively, of a two-level variable voltage control signal.

A further object of this invention is to provide a complementary signal generating network which is responsive to the voltage levels of a two-level variable voltage control signal for selectively passing an applied electrical pulse signal to produce two complementary electrical output signals corresponding to the two voltage levels of the control signal, respectively.

Still another object of this invention is to provide a complementary signal generating network which includes two electronic gating circuits, each of the gating circuits being responsive to a different predetermined voltage level of an applied control signal for passing an applied electrical pulse signal.

It is also an object of this invention to provide a complementary signal generating network which includes two diode gating circuits, one diode in each of the gating circuits being responsive to the voltage level of an applied variable voltage control signal for electrically gating an applied electrical pulse signal to produce two complementary electrical output signals.

The novel features which are believed to be characteristic of the invention, both as to its organization and method of operation, together with further objects and advantages thereof, will be better understood from the following description considered in connection with the accompanying drawings in which two embodiments of the invention are illustrated by way of examples. It is to be expressly understood, however, that the drawings are for the purpose of illustration and description only, and are not intended as a definition of the limits of the invention.

Figure 1:
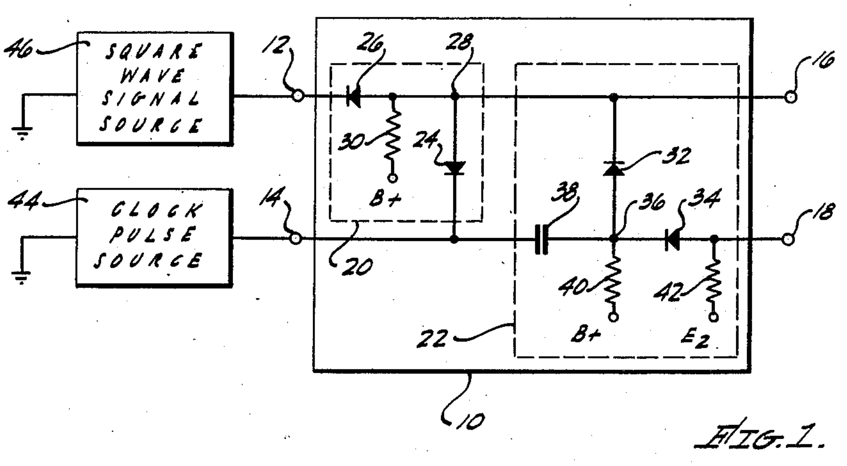
Fig. 1 is a schematic diagram of one embodiment of a complementary signal generating network, according to this invention.

Referring now to the drawings, wherein like reference characters are utilized to designate like or corresponding parts throughout the several views, there is shown in Fig. 1 a complementary signal generating network or "logical" network 10 which is responsive to the voltage level of a variable voltage control signal applied at a control terminal 12 for selectively passing an electrical pulse signal applied at an input terminal 14 to produce two complementary electrical pulse output signals at a first output terminal 16 and a second output terminal 18, respectively.

Complementary signal generating network 10 includes first and second electronic gating circuits 20 and 22, respectively, responsive to different predetermined voltage levels of the applied control signal for selectively presenting the applied electrical pulse signal at output terminals 16 and 18, respectively. First gating circuit 20 includes a pair of unidirectional current devices, such as crystal diodes 24 and 26, the cathode of diode 24 being connected to input terminal 14 and the cathode of diode 26 being connected to control terminal 12. Diodes 24 and 26 have their anodes connected together at a common junction 28 which is connected to output terminal 16. Common junction 28 is also coupled to one terminal B+ of a source of biasing potential, not shown, by a biasing resistor 30, the other terminal of the source being grounded.

Second gating circuit 22 also includes a pair of serially connected unidirectional current devices, such as crystal diodes 32 and 34, interconnecting common junction 28 with output terminal 18, the cathode of diode 32 being connected to common junction 28 and the anode of diode 34 being connected to output terminal 18. The common junction 36 of diodes 32 and 34 is in turn coupled to input terminal 14 by a capacitor 38 and to one terminal B+ of the source of biasing potential, not shown, by a biasing resistor 40. In a similar manner, diode 34 has its anode coupled to one terminal $E_2$ of a source of biasing potential, not shown, by a biasing resistor 42. The other terminal of each of the sources is connected to ground. The function of the biasing potentials at terminals B+ and $E_2$ and typical values thereof will be described in detail below. For reasons which will become more clearly understood later, however, it should be stated that the potential appearing at terminal $E_2$ is lower than the potential at terminal B+.

In operation, input terminal 14 is connected to a source 44 of negative electrical clock pulses to be selectively passed, and control terminal 12 is connected to a variable potential control signal source, such as a squarewave signal source 46 which controls the selectivity of gating circuits 20 and 22. Source 46 may be any suitable source of a signal having alternate relatively high and relatively low voltage levels, such as a conventional voltage state gating matrix.

Figure 2:
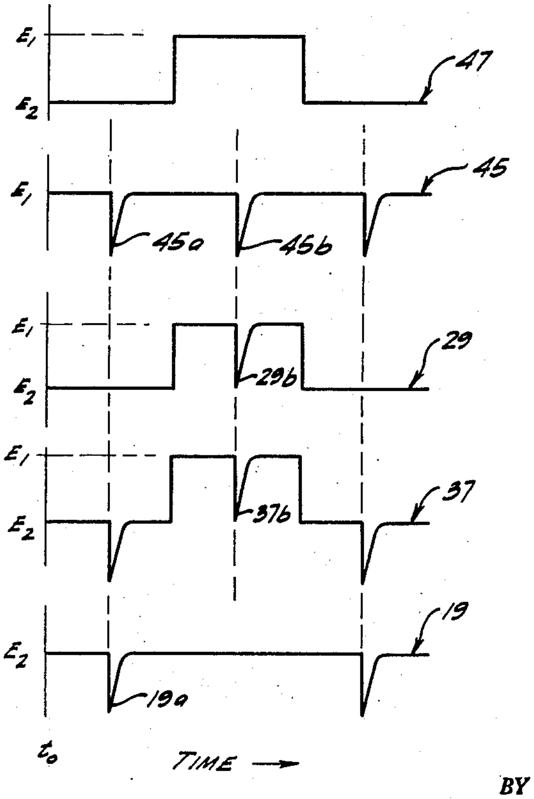
Fig. 2 is a composite diagram of the waveforms of signals occurring at various points in the circuit of Fig. 1.

Referring now to Fig. 2, there is shown a composite diagram of the waveforms appearing at various points in the complementary signal generating network of Fig. 1. The control signal, generally designated 47, which is applied to control terminal 12 from source 46, includes alternate relatively low and high voltage levels $E_2$ and $E_1$, respectively, the voltage level $E_2$ corresponding substantially to the biasing potential at terminal $E_2$. The negative electrical pulse signal, generally designated 45, which is applied to input terminal 14 from source 44, has a steady state voltage level which is preferably substantially equal to potential $E_1$, the periodically recurring negative pulse excursions of signal 45 lowering the potential of the signal accordingly.

Assume now that signal 47 is initially at its low potential value of $E_2$, as shown at time $t_0$ in Fig. 2. Under these conditions the signal, generally designated 29, appearing at common junction 28 will be at a voltage level substantially equal to level $E_2$ due to the clamping action of diode 26. In a similar manner, the signal, generally designated 37, appearing at common junction 36 will have a potential value substantially equal to $E_2$ due to the clamping action of diode 32. Consequently, the potential difference across diode 34 in second gating circuit 22 is substantially zero volts, whereas diode 24 in first gating circuit 20 is back-biased by substantially the voltage differential between the voltage levels $E_1$ and $E_2$.

Consider now the behavior of complementary signal generating network 10 when signal 45 includes a first negative pulse 45*a*, the pulse amplitude being equal to or less than the voltage differential between voltage levels $E_1$ and $E_2$. Since the amplitude of pulse 45*a* is insufficient to drive the cathode of diode 24 below voltage level $E_2$, it is apparent that diode 24 will remain back-biased. Accordingly diode 24 will not pass the negative pulse to common junction 28 and hence to output terminal 16.

When negative pulse 45*a* is applied to input terminal 14, the potential of common junction 36, heretofore clamped substantially at level $E_2$ by diode 32, will be lowered accordingly, due to the coupling action of capacitor 38. It is clear, of course, that diode 32 will be immediately back-biased for the duration of pulse **45*a*, since its cathode is held substantially at level $E_2$ due to the clamping action of diode 26, whereas its anode will fall below potential $E_2$ by approximately the amplitude of pulse 45*a*. It follows then, that pulse 45*a* is inhibited from appearing at output terminal 16 by back-biased diodes 24 and 32**.

It is clear, however, that diode 34 is now front biased by the application of pulse **45*a* since the potential of common junction 36 and hence the cathode of diode 34 is driven below the voltage level $E_2$ by the magnitude of the applied pulse. Accordingly, negative pulse 45*a* will be passed by diode 34 and will result in a corresponding negative pulse 19*a* in the signal, generally designated 19, which appears at output terminal 18**.

Assume now that signal 47 swings to its relatively high level potential value $E_1$, and that signal 45 is at its steady state level $E_1$. Under these conditions, the potentials at common junctions 28 and 36 also swing to voltage level $E_1$ due to the clamping action of diodes 26 and 32, respectively. Consequently, the potential difference across diode 24 in first gating circuit 20 is substantially zero, whereas diode 34 in second gating circuit 22 is back-biased by substantially the voltage differential between the voltage levels $E_1$ and $E_2$.

Let us now assume that signal 45 includes a negative pulse **45*b*, the ampltitude of which is equal to or less than the voltage differential between voltage levels $E_1$ and $E_2$. It is immediately clear that diode 24 will be front-biased and will, therefore, pass pulse 45*b* and produce a corresponding output pulse 29*b* in signal 29 appearing at output terminal 16**.

Although pulse **45*b* is also applied to common junction 36 by coupling capacitor 38, it will be noted that the pulse 37*b* appearing in signal 37 does not lower the potential of common junction 36 below potential level $E_2$. Accordingly, diode 34 will remain back-biased and thereby inhibit the applied negative electrical pulse from appearing at output terminal 18**.

If signal 47 applied to control terminal 12 of complementary signal generating network 10 again swings to its low potential value of $E_2$ as illustrated in Fig. 2, a negative pulse **45*c* applied to input terminal 14 will again produce a corresponding negative pulse 19*c* at output terminal 18 and will be inhibited from appearing in signal 29 at output terminal 16. It is clear therefore, that complementary signal generating network 10 is responsive to the relatively high and relatively low potential levels of control signal 47 for selectively passing negative electrical pulses applied at input terminal 12 to produce two complementary output signals at output terminals 16 and 18, respectively. In other words, an applied electrical pulse signal will be presented at either output terminal 16 or at output terminal 18 depending upon whether control signal 47** is at its relatively high potential value or its relatively low potential value, respectively.

As set forth above, diode 26 and resistor 30 are utilized for clamping common junction 28 at substantially the instantaneous voltage of control signal 47. However, diode 26 also performs the additional function of inhibiting electrical pulses appearing at junction 28, such as pulse **29*b* in signal 29, from being applied back into squarewave signal source 46. For example, when electrical pulse 45*b* is applied at input terminal 14, the potential of common junction 28 drops below its clamped potential level $E_1$ by the voltage amplitude of pulse 29*b*. Since the potential $E_1$ is being applied to the cathode of diode 26 at this time, diode 26 is back-biased for the duration of pulse 29*b*, thereby effectively isolating source 46 from clock pulse source 44. The combination of diode 26 and resistor 30** may, therefore, be termed an isolating network.

It will be recognized by those skilled in the computer art that if squarewave signal source 46 comprises a voltage state gating matrix having a conventional diode "and" gate output circuit, the isolating network including diode 26 and resistor 30 may be eliminated from complementary signal generating network 10. In other words, if squarewave signal source 46 includes an "and" gate output circuit, the function of diode 26 and resistor 30 may be performed by the output circuit of the source, and the isolating network may be excluded from complementary signal generating network 10.

The embodiment of the present invention shown in Fig. 1 has been disclosed with reference to selectively passing an applied negative electrical pulse signal to produce two complementary electrical output signals. As will become apparent from the description below, however, the complementary signal generating networks of this invention may also be utilized for selectively passing an applied positive electrical pulse signal.

Figure 3:
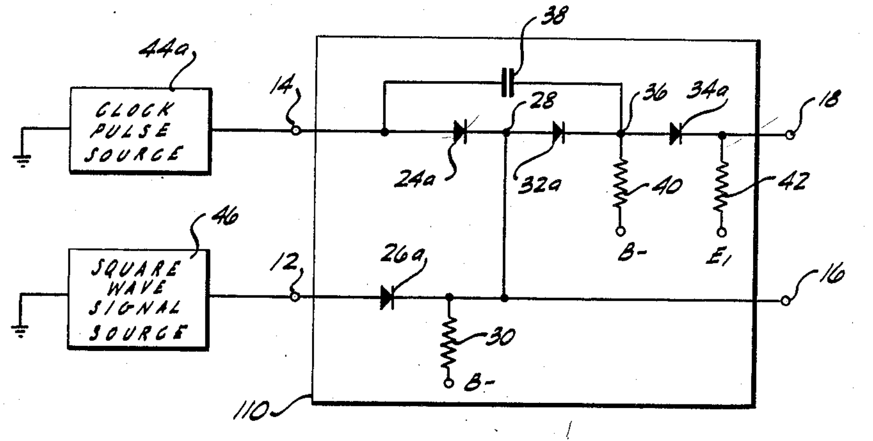
Fig. 3 is a schematic diagram of another embodiment of a complementary signal generating network, according to this invention.

Referring now to Fig. 3, there is shown a complementary signal generating network 110 which includes control and input terminals 12 and 14, respectively, and two output terminals 16 and 18, respectively, identical to the terminals shown in Fig. 1. Again, as in Fig. 1, squarewave signal source 46 is connected to control terminal 12, while input terminal 14 is connected to a source **44*a* of electrical pulses. The pulses generated by source 44*a* of Fig. 3 are of positive polarity in distinction to the negative pulses generated in pulse source 44** of Fig. 1.

The internal structure and electrical components of complementary signal generating network 110 are identical to the structure, and components of complementary signal generating network 10 shown in Fig. 1 with two exceptions. Firstly, the polarity of each of diodes 24, 26, 32 and 34 of Fig. 1 has been reversed, these diodes being designated **24*a*, 26*a*, 32*a* and 34*a*, respectively, in Fig. 3. Secondly, the potentials applied to resistors 30, 40 and 42 in Fig. 1 have been changed so that in Fig. 3, resistors 30 and 40 are each connected to one terminal B− of a source of negative potential not shown, while resistor 42** is connected to one terminal $E_1$ of a source of potential, not shown. A second terminal of each of these sources is grounded.

It will be readily noted that by diagrammatically arranging the electrical components of complementary signal generating network 110 in the manner illustrated in Fig. 3, the combination of diode **24*a*, 32*a* and 34*a* may be considered to be three cascaded or serially connected diodes intercoupling input terminal 14 and output terminal 18**. A similar schematic rearrangement may also be performed on the circuit of Fig. 1.

Figure 4:
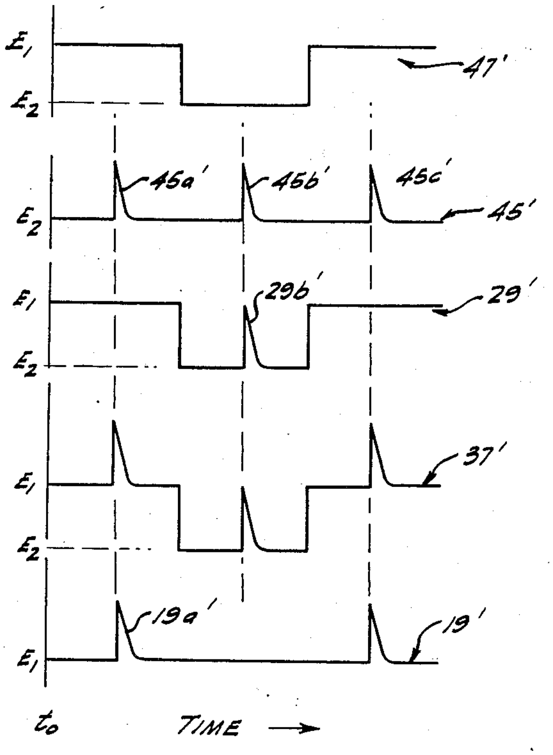
Fig. 4 is a composite diagram of the waveforms of signals appearing at various points in the circuit of Fig. 3.

Referring now to Fig. 4, there is shown a composite diagram of the waveforms of the electrical signals appearing at various points in Fig. 3. The control signal, generally designated 47′, which is applied to control terminal 12 from squarewave signal source 46, again swings between relatively high and low potential levels $E_1$ and $E_2$, respectively. The electrical pulse signal, generally designated 45′, which is applied at input terminal 14 from clock pulse source **44*a*, has a steady state potential substantially equal to level $E_2$ and includes periodically recurring positive pulses such as pulses 45*a*′, 45*b*′ and 45*c*′**.

In operation, when control signal 47′ is at its relatively high potential level $E_1$, diode **24*a* is back biased by the clamping action of diode 26*a* and common junction 36 is held substantially at level $E_1$ due to the clamping action of diode 32*a*, thereby maintaining the potential difference across diode 34*a* substantially at zero. Accordingly, when pulse 45*a*′ is applied at input terminal 14, and at common junction 36 by coupling capacitor 38, diode 34*a* is front biased and produces a corresponding pulse 19*a*′ in the output signal, generally designated 19′, appearing at output terminal 18. Simultaneously, diode 32*a* is back biased for the duration of the applied positive pulse, and, together with back-biased diode 24*a*, inhibits the applied pulse from appearing at output terminal 16. It will be recognized, of course, that the amplitude of the applied pulse should not exceed the potential difference between potential levels $E_1$ and $E_2$. Thus, when signal 47' is at its high potential level, the applied electrical pulse signal presents a corresponding pulse signal only at output terminal 18**.

When control signal 47' is at its low potential level $E_2$, on the other hand, common junctions 28 and 36 are held substantially at potential level $E_2$ by the clamping action of diodes **26*a* and 32*a*, respectively. Diode 34*a* is, therefore, back biased by the voltage differential between voltage levels $E_1$ and $E_2$, whereas both the anode and cathode of diode 24*a*** are at substantially the potential level $E_2$.

Accordingly, when a positive pulse **45*b'* is applied at input terminal 14, diode 24*a* is front biased and produces a corresponding pulse 29*b'* in the output signal, generally designated 29', appearing at output terminal 16. Diode 34*a*, on the other hand, remains back biased and thus inhibits the applied pulse from appearing at output terminal 18**.

It is clear, therefore, that complementary signal generating network 110 is responsive to the voltage level of the applied control signal for selectively passing an applied positive electrical pulse signal to produce two complementary electrical output signals at output terminals 16 and 18, respectively.

It should be noted that in each of the described embodiments both of the voltage levels of the control signal have been assumed to be positive with respect to ground, and the output signals have been assumed to include a direct-current voltage level. Obviously, the circuits of this invention may be utilized with control signals in which either or both voltage levels are negative with respect to ground. In addition, the direct-current voltage levels of the complementary output signals may be removed in any well-known manner, such as capacitive coupling between the output terminals and an output circuit.

In both of the described embodiments of this invention, the control signal and the pulse signal both have been assumed to be periodic, and the control signal has been shown as being of symmetrical squarewave configuration. It should be apparent, however, that the complementary signal generating networks of this invention are also applicable to aperiodic pulse signals and to aperiodic and unsymmetrical control signals.

What is claimed as new is:

1. A complementary signal generating network for selectively passing an electrical pulse signal in response to the instantaneous voltage level of a two-level control signal to produce two complementary electrical output signals, said network comprising: first and second output terminals; first and second electronic gating circuits each including a diode having first and second terminals, the first terminal of the diodes in said first and second gating circuits being connected to said first and second output terminals, respectively, said first gating circuit further including means for applying the control signal and the pulse signal to the first and second terminals, respectively, of its associated diode, said second gating circuit further including means for applying the control and pulse signals to the second terminal of its associated diode, the diode in said first gating circuit being responsive to one voltage level of the two-level control signal for passing the applied pulse signal to produce one of the two complementary electrical output signals, the diode in said second gating circuit being responsive to the other voltage level of the two-level control signal for passing the applied pulse signal to produce the other of the two complementary electrical output signals.

2. The complementary signal generating network defined in claim 1 wherein said first terminal of the diode in each of said first and second gating circuits is the anode and the applied pulse signal includes a series of negative electrical pulses.

3. The complementary signal generating network defined in claim 1 wherein said first terminal of the diode in each of said first and second gating circuits is the cathode and the applied pulse signal includes a series of positive electrical pulses.

4. A complementary signal generating network for selectively passing an applied electrical pulse signal in response to the voltage level of a two-level variable voltage control signal to produce two complementary electrical output signals, said network comprising: first and second output terminals; a first electronic gating circuit including means for receiving the applied electrical pulse signal and the control signal and a first unidirectional current device interconnecting said means and said first output terminal, and responsive to one of the two voltage levels of the control signal for passing the electrical pulse signal to produce one of the two complementary electrical output signals; a second electronic gating circuit including a second unidirectional current device connected to said second output terminal and means for applying the control signal and the electrical pulse signal to said second unidirectional current device, said second unidirectional current device being responsive to the other of the two voltage levels of the control signal for passing the electrical pulse signal to produce the other of the two complementary electrical output signals.

5. A complementary signal generating network for selectively passing an applied electrical pulse signal in response to first and second predetermined voltage levels of a variable voltage control signal to produce first and second complementary electrical output signals, said network comprising: first and second output terminals; a first electronic gating circuit connected to said first output terminal, said first gating circuit including a first unidirectional current device and means for receiving the applied electrical pulse signal and the control signal, said first unidirectional current device being responsive to the first predetermined voltage level of the control signal for passing the electrical pulse signal to produce the first electrical output signal at said first output terminal; a second electronic gating circuit connected to said second output terminal and including a second unidirectional current device and means for applying the control signal and the electrical pulse signal to said second gating circuit, said second unidirectional current device being responsive to the second predetermined voltage level of the control signal for passing the electrical pulse signal to produce the second electrical output signal at said second output terminal.

6. A complementary signal generating network for selectively passing applied electrical pulses to produce first and second complementary electrical pulse signals in response to first and second predetermined voltage levels, respectively, of a variable voltage level control signal, said network comprising: first, second and third unidirectional current devices each having first and second ends, the second ends of said first and second unidirectional current devices being connected to the first ends of said second and third unidirectional current devices, respectively; means for applying the electrical pulses to the first ends of said first and third unidirectional current devices; biasing means connected to said third unidirectional current device to normally maintain said third unidirectional device back-biased; and means for applying the control signal to the second end of said first unidirectional device; said first unidirectional current device being responsive to the first predetermined voltage level of the control signal for passing the applied electrical pulse to produce the first complementary electrical pulse signal; said second unidirectional current device being normally front-biased in response to the instantaneous voltage of the control signal for maintaining the potential at the first end of said third unidirectional current device at said instantaneous voltage, said second unidirectional current device being back-biased when an electrical pulse is applied to said first end of said third unidirectional current device; and said third unidirectional current device being responsive to the application of the electrical pulses when the potential at said first end is at the second predetermined voltage level for producing the second complementary electrical output signal.

7. The complementary signal generating network defined in claim 6 wherein said unidirectional current devices are crystal diodes, the first end of each of said diodes being the cathode.

8. The complementary signal generating network defined in claim 6 wherein said unidirectional current devices are crystal diodes, the first end of each of said diodes being the anode.

9. A "logical" network comprising a first gating circuit having at least a single input circuit and an output circuit, means for applying a binary signal to said input circuit, a second gating circuit having at least a single input circuit and an output circuit, means for applying a clock pulse signal to the input circuit for said second gating circuit, and an electrical connection between said gating circuits for applying the binary signal to said second gating circuit and the clock pulse to said first gating circuit, each of said gating circuits being arranged for selectively passing a different predetermined combination of said binary and clock pulse signals thereby to produce a corresponding output signal therefrom at said respective output circuits.

10. A "logical" network as defined in claim 9 wherein each of said gating circuits includes at least a single asymmetrical conductive device connected to its associated input circuit to directly receive the electrical signal applied ot said associated input circuit.

11. A "logical" network comprising a first "and" gating circuit having at least a single input circuit and an output circuit, means for applying a binary signal to said input circuit, a second "and" gating circuit having at least a single input circuit and an output circuit, means for applying a clock pulse signal to the input circuit for said second "and" gating circuit, and an electrical connection between said gating circuits for applying the binary signal to said second gating circuit and the clock pulse to said first gating circuit, each of said gating circuits being arranged for selectively passing a different predetermined combination of said binary and clock pulse signals thereby to produce a corresponding output signal therefrom at said respective output circuits.

12. A "logical" network comprising a first gating circuit having at least a single input circuit and an output circuit, maens for applying a binary signal to said input circuit, a second gating circuit having at least a single input circuit and an output circuit, means for applying a clock pulse signal to the input circuit for said second gating circuit, and electrical circuit means including an asymmetrically conductive device connected between said gating circuits for applying the binary signal to said second gating circuit and a clock pulse signal to said first gating circuit, each of said gating circuits being arranged for selectively passing a different predetermined combination of said binary and clock pulse signals thereby to produce a corresponding output signal therefrom at said respective output circuits.

References Cited in the file of this patent

UNITED STATES PATENTS

| | | |
|---|---|---|
| 2,396,395 | Smith | Mar. 12, 1946 |
| 2,413,440 | Farrington | Dec. 31, 1946 |
| 2,513,910 | Bliss | July 4, 1950 |
| 2,685,039 | Scarbrough et al. | July 27, 1954 |

FOREIGN PATENTS

| | | |
|---|---|---|
| 504,662 | Canada | July 27, 1954 |

OTHER REFERENCES

Article: Diode Coincidence and Mixing Circuits in Digital Computers: by Lung Chung Chien, from May 1950 Proc. of IRE; pages 511–514.